United States Patent

Hiltebrand

[11] Patent Number: 5,232,014
[45] Date of Patent: Aug. 3, 1993

[54] CHECK VALVE

[75] Inventor: Eduard Hiltebrand, Schaffhausen, Switzerland

[73] Assignee: Georg Fischer AG, Schaffhausen, Switzerland

[21] Appl. No.: 848,330

[22] Filed: Mar. 9, 1992

[30] Foreign Application Priority Data

Mar. 18, 1991 [DE] Fed. Rep. of Germany ....... 4108790

[51] Int. Cl.⁵ ............................................. F16K 15/04
[52] U.S. Cl. .............................. 137/515.7; 137/533.13; 137/533.15
[58] Field of Search ........................ 137/533.11, 533.13, 137/533.15, 539, 539.5

[56] References Cited

U.S. PATENT DOCUMENTS

| | | | |
|---|---|---|---|
| 2,322,139 | 6/1943 | Kaelin | 137/539.5 |
| 4,197,875 | 4/1980 | Schieferstein | 137/539 |
| 4,347,915 | 9/1982 | Cooper | 137/539 X |

FOREIGN PATENT DOCUMENTS 90768 7/1980 Japan ............................ 137/533.11

Primary Examiner—Robert G. Nilson
Attorney, Agent, or Firm—Anderson Kill Olick & Oshinsky

[57] ABSTRACT

A check valve includes a spherical closing member arranged in a flow duct of a valve body. The flow duct includes guide ribs with stop surfaces. The spherical closing member is displaceable by medium flowing through the valves between the stop surfaces and a sealing portion. An annular portion is arranged between the sealing portion and the guide ribs. The annular portion has an internal bore which is slightly greater than the diameter of the spherical closing member. Starting from the equator of the spherical closing member resting against the sealing member, the partial length of the internal bore of the annular portion in flow direction of the medium is 1/7 to ½ of the diameter of the spherical closing member.

5 Claims, 1 Drawing Sheet

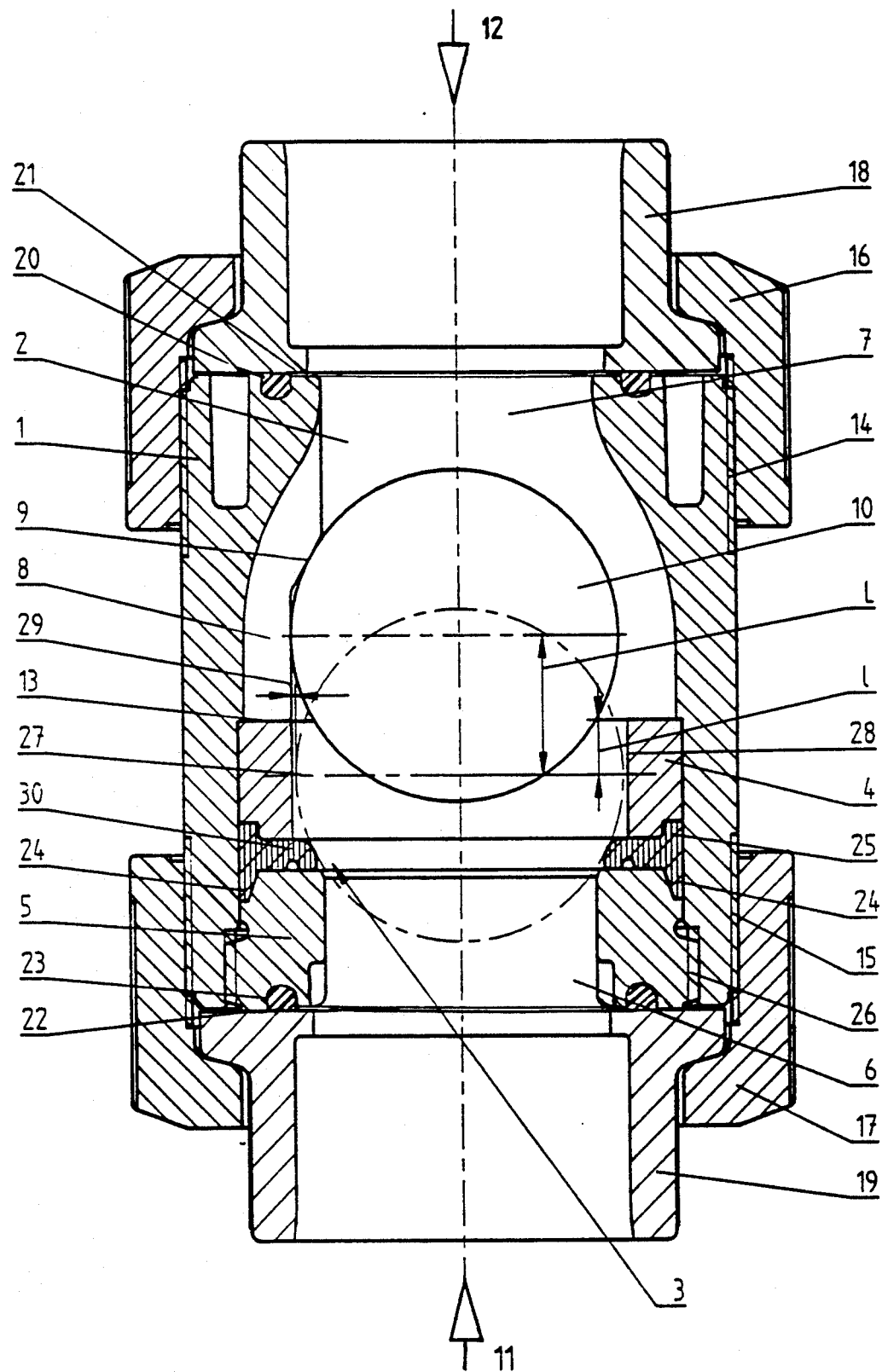

CHECK VALVE

BACKGROUND OF THE INVENTION

1. Field of the Invention

The present invention relates to a check valve with a spherical closing member arranged in a flow duct of a valve body. The spherical closing member is displaceable by the medium flowing through the valve and in a closing position rests against a sealing portion with an elastic sealing member. The spherical closing member is guided by guide ribs which are arranged in the flow duct and include stop surfaces.

2. Description of the Related Art

Check valves of the above-described type are known, for example, from a brochure of Georg Fischer AG "Kugelruckschlagventil" [Ball Check Valve], Brochure No. FI 679M of March 1984.

The known check valve mentioned above has the disadvantage that when the check valve is opened, a large cross-sectional flow area is immediately created, so that in case of greater flow velocity of the medium, turbulences and vibrations occur which cause the spherical closing member to be pushed back and forth. This results in wear and breaks of the material of the closing member, so that over a long period of time, a problem-free sealing effect in the closed position cannot be ensured. Wear also occurs at the stop surfaces and the guide ribs for the closing member. The worn or broken material components cause impurities in the medium and may lead to additional damage in valves, pumps and other fittings arranged in the pipe line system.

SUMMARY OF THE INVENTION

Therefore, it is the object of the present invention to provide a check valve of the above-described type in which turbulences and, thus, impacts of the closing member and damage to the closing member are avoided even in the case of varying low velocities.

In accordance with the present invention, the object is met by providing an annular portion arranged adjacent the sealing portion and downstream in flow direction of the medium. The annular portion has an internal bore which forms a narrow gap with the equator of the spherical member resting against the sealing member. Starting from the location of the equator of the spherical closing member in the closing position, the partial length of the internal bore of the annular portion in flow direction of the medium is 1/7 to ½ of the diameter of the spherical closing member.

As a result of the arrangement and configuration of an annular member adjacent the sealing member in accordance with the present invention, the spherical closing member is accelerated in a central position by the annular jet occurring in the annular portion shortly after opening of the valve and the spherical closing member is moved to its stop without substantial lateral movement, so that impacts of spherical closing member as well as vibrations are prevented.

Consequently, damage to the valves and the occurrence of particles in the medium are avoided, so that a permanent operational safety of the valve is ensured.

It has been found that the closing member reaches contact with the stop surface without vibrations even in the case of flow velocities of the medium which are higher than were conventional in the past.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

The single figure of the drawing is a longitudinal sectional view of a check valve according to the present invention.

DESCRIPTION OF THE PREFERRED EMBODIMENT

The check valve illustrated in the drawing includes a valve body 1 with a flow duct 2. A sealing portion 3 with a sealing member 30 is arranged on a side of the flow duct 2. The sealing portion 3 is tightly clamped between an annular portion 4 and a pressure ring 5. The pressure ring 5 has an inlet opening 6 for the medium. Preferably, the inlet opening 6 has the same cross-section as the outlet opening 7 of the flow duct 2 arranged at the opposite end of the valve body 1.

Preferably three guide ribs 8 are arranged uniformly distributed on the inner circumference of the flow duct 2. Each guide rib 8 forms a stop surface 9. A spherically constructed closing member 10 is arranged slidably and in a guided manner between the guide ribs 8. During normal flow of the medium through the valve in direction of arrow 11, the closing member 10 rests against the stop surfaces 9. When the medium flows in the opposite direction in accordance with arrow 12, the closing member 10 is pressed by the pressure of the medium against the sealing member 30, so that the return flow is blocked. The guide ribs 8 each have an end face 13 which is in contact with the annular portion 4.

The flow duct 2 has an inner contour which has a shape which is advantageous to the flow of the medium toward the outlet opening 7.

The valve body 1 is provided at both ends thereof with external threads 14, 15 Flange nuts 16, 17 can be screwed onto the external threads 14, 15.

A flange bushing 18 can be pressed by means of the flange nut 16 against the end faces 21 of the valve body 1 which are provided with a sealing member 20 and can be fastened on the valve body 1 in a sealing manner.

The flange nut 17 presses a flange bushing 19 against the end face 22 of the pressure ring 5 which is provided with a sealing member 23.

The pressure ring 5 is directly screwed into an internal thread 26 of the body 1, so that the annular portion 4 is pressed through the sealing member 30 against the end face The components of the check valve are preferably made of a plastics material, such as polyvinylchloride. As a result, the check valve can be used for aggressive media. Of course, the check valve can also be manufactured of other materials, such as, steel, copper, brass, etc.

The sealing member 30 is arranged concentrically with its outer diameter in the body 1 and is held between the annular portion 4 and the pressure ring 5. Annular beads of the sealing member 30 engage in a recess 24 of the pressure ring 5 and in a recess 25 of the annular portion 4, so that the sealing member is tightly mounted.

The annular portion 4 has a preferably cylindrical internal bore 28 whose internal diameter is greater than the diameter of the spherical closing member 10 by 2/100 to 5/100, preferably 2.5/100 to 4.2/100, of the diameter of the spherical closing member 10. This difference results in a gap 29. Starting from the location of the equator 27 of the spherical closing member 10 in the closing position thereof as indicated by dash-dot lines, the internal bore 28 has an internal length 1 in direction of the displacement path or the flow direction indicated by arrow 11 which is about 1/7 to ½, preferably 1/6 to ⅓ of the diameter of the spherical closing member 10. Preferably, the displacement distance L of the spherical closing member 10 is approximately ½ to 4/5, preferably ½ to ¾, of the diameter of the spherical closing member 10.

The above-described configuration of the internal bore 28 of the annular portion 4 and the above-mentioned relationship of the dimensions of the spherical closing member and the displacement distance have the result that when the check valve is open, the spherical closing member 10 is accelerated and is moved against the stop surfaces 9 centrally without vibration and without being pushed back and forth by a medium jet which is annular because of the annular portion 4. Consequently, damage to the spherical closing member is essentially avoided and the check valve can be used even for flow velocities of the flow medium which are greater than 2 m/s. It has been found that also in the case of low flow velocities of 0.5 m/s the spherical closing member 10 reaches contact with the stop surfaces 9 without vibration.

The width of the gap 29 is such that particles which may be present in the medium cannot become stuck in the gap or that these particles are flushed again when the check valve is completely opened.

While a specific embodiment of the invention has been shown and described in detail to illustrate the inventive principles, it will be understood that the invention may be embodied otherwise without departing from such principles.

I claim:

1. In a check valve with a spherical closing member arranged in a flow duct of a valve body, the spherical closing member being displaceable by a medium flowing through the flow duct, the flow duct having guide ribs which include stop surfaces, the spherical closing member being dislaceable by a displacement distance between the stop surfaces and a closing position in which the spherical closing member rests against a sealing portion, the sealing portion having an elastic sealing member, the spherical closing member having an equator and a diameter, the improvement comprising an annular portion arranged adjacent the sealing portion and downstream of the sealing portion in flow direction of the medium, the annular portion having an internal bore, a narrow gap being defined between the internal bore and the equator of the spherical member when the spherical member is in the closing position, wherein, starting from the equator of the spherical closing member when the spherical closing member is in the closing position, the length of the internal bore of the annular portion in the flow direction of the medium is 1/7 to ½ of the diameter of the spherical closing member.

2. The check valve of claim 1, wherein the length of the internal bore if 1/6 to ⅓ of the diameter of the spherical closing member.

3. The check valve of claim 1, wherein the displacement distance of the spherical closing member is ½ of 4/5 of the diameter of the spherical closing member.

4. The check valve of claim 1, wherein the internal bore has a diameter which is greater than the diameter of the spherical closing member by 2/100 to 5/100 of the diameter of the spherical closing member.

5. The check valve of claim 1, wherein the valve body has an internal thread, a pressure ring being screwed into the internal thread for pressing the annular portion against an end face of he valve body.

* * * * *